US008914570B2

(12) United States Patent
Balakrishnan et al.

(10) Patent No.: US 8,914,570 B2
(45) Date of Patent: Dec. 16, 2014

(54) SELECTIVE WRITE-ONCE-MEMORY ENCODING IN A FLASH BASED DISK CACHE MEMORY

(75) Inventors: Ganesh Balakrishnan, Apex, NC (US); Anil Krishna, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 204 days.

(21) Appl. No.: 13/464,084

(22) Filed: May 4, 2012

(65) Prior Publication Data
US 2013/0297853 A1 Nov. 7, 2013

(51) Int. Cl.
  *G06F 12/00* (2006.01)
(52) U.S. Cl.
  USPC ............ 711/103; 711/156; 711/202; 711/221
(58) Field of Classification Search
  USPC .......................................................... 711/103
  See application file for complete search history.

(56) References Cited

U.S. PATENT DOCUMENTS

| | | | |
|---|---|---|---|
| 4,691,299 A | 9/1987 | Rivest et al. | |
| 5,822,781 A | 10/1998 | Wells et al. | |
| 6,794,997 B2 | 9/2004 | Sprouse | |
| 7,177,974 B2 | 2/2007 | Egner et al. | |
| 7,529,142 B2 | 5/2009 | Widdershoven | |
| 7,656,706 B2 | 2/2010 | Jiang et al. | |
| 7,861,058 B2 | 12/2010 | Moore et al. | |
| 8,327,246 B2 * | 12/2012 | Weingarten et al. ........... 714/790 |
| 2002/0087784 A1 * | 7/2002 | Egner et al. ..................... 711/111 |
| 2002/0136068 A1 * | 9/2002 | Widdershoven ............... 365/200 |
| 2004/0141358 A1 * | 7/2004 | Egner et al. ..................... 365/145 |
| 2008/0162821 A1 | 7/2008 | Duran et al. | |
| 2011/0040932 A1 | 2/2011 | Frost et al. | |

OTHER PUBLICATIONS

Taeho Kgil, David Roberts and Trevor Mudge, Improving NAND Flash Based Disk Caches, International Symposium on Computer Architecture, 2008, pp. 327-338.
Laura Grupp et al., Characterizing Flash Memory: Anomalies, Observations, and Applications, International Symposium on Microarchitecture, 2009, http://cmrr-star.ucsd.edu/starpapers/309-Grupp-1.pdf.
Ronald Rivest and Adi Shamir, How to Reuse a "Write-Once" Memory, ACM Symposium on the Theory of Computing, 1982, http://people.csail.mit.edu/rivest/RivestShamir-HowToReuseAWriteOnceMemory.pdf.
http://www.bitmicro.com/press_resources_flash_ssd.php.

* cited by examiner

*Primary Examiner* — April Y Blair
*Assistant Examiner* — Prasith Thammavong
(74) *Attorney, Agent, or Firm* — H. Daniel Schnurmann; Arnold Bangali

(57) ABSTRACT

In a method for storing data in a flash memory array, the flash memory array includes a plurality of physical pages. The method includes receiving a request to perform a data access operation through a communication bus. The request includes data and a logical page address. The method further includes allocating one or more physical pages of the flash memory array to perform the data access operation. The method further includes, based on a historical usage data of the flash memory array, selectively encoding the data contained in the logical page into the one or more physical pages.

16 Claims, 12 Drawing Sheets

| LOGICAL VALUE | PHYSICAL VALUE WRITTEN AT 1ST WRITE | PHYSICAL VALUE WRITTEN AT 2ND WRITE |
|---|---|---|
| 00 | 111 | 000 |
| 01 | 110 | 001 |
| 10 | 101 | 010 |
| 11 | 011 | 100 |

FIG. 7

SELECTIVE WRITE-ONCE-MEMORY ENCODING IN A FLASH BASED DISK CACHE MEMORY

TECHNICAL FIELD

The present invention relates generally to data storage and more specifically to selective use of Write-Once-Memory (WOM) encoding in a flash based disk cache memory.

BACKGROUND

A hard disk drive often has an associated disk cache that is used to speed up access to data on the disk since the access speed of the disk cache is significantly faster than the access speed of the hard disk drive. A disk cache is a storage device that is often a non-volatile storage device such as a flash memory. It is typically implemented by storing the most recently accessed data. When a computer needs to access new data the disk cache is first checked before attempting to read the data from the disk drive. Since data access from the cache is significantly faster than data access from the disk drive, disk caching can significantly increase performance.

Typical flash memory devices are formed from a number of individual storage elements, where each storage element consists of a memory cell that includes a transistor and a charge storage area. The presence or absence of an electronic charge in the charge storage area of a cell can be used to store a logic "1" or a logic "0" in the cell.

In general, there are a number of operations that are performed within flash memory devices. The most common such operations are the ERASE, PROGRAM, and READ operations. During an ERASE operation, the logical bit stored in a given memory cell is set to a logical "0", which—in the example of discussion—corresponds to the absence of a substantial electric charge in the memory cell's charge storage area. Because of the physical nature of most NAND flash memory devices, the ERASE operation is performed on a block basis. Thus, anytime one desires to erase the data in a given memory cell within a given block, one will also erase the data in all other memory cells within that block.

After a block of flash memory is erased, the individual data within the device can be programmed. The PROGRAM operation involves the writing of data into a memory cell that has been previously ERASED. The PROGRAM operation is performed in such a way that all of the bits being programmed (typically all of the bits within a single page) will be programmed to have the desired "1" or "0" levels at the same time. Once pages of flash memory device are programmed, they can be read. In general, the READ operation involves the reading of the logical data stored in the memory cells of a page of flash data.

Block ERASE operations are expensive in terms of power and performance because they are often preceded by a number of READ operations and PROGRAM operations as valid data is moved around the flash memory in preparation for a block erase operation. In addition, there is a fixed limit on the number of erases a flash cell (the smallest unit of flash memory) can handle, beyond which the flash cell becomes unreliable. Thus, the performance, power and reliability of flash memory can become a concern as the number of invalidations grows.

SUMMARY

In one aspect, an embodiment of the invention provides a method for storing data in a flash memory array using a selective encoding scheme. The decision as to whether or not to encode the physical memory pages is made dynamically at the time the pages are allocated.

In another aspect, an embodiment of the invention maintains a historical usage data of the flash memory array. The historical usage data of the flash memory array includes a plurality of counters. Each counter corresponds to a logical page stored in the flash memory array. Each counter indicates a number of completed write operations associated with the corresponding logical page.

In a further aspect, an embodiment of the invention provides dividing a plurality of logical pages stored within the flash memory array into two or more groups based on predetermined criteria. The historical usage date includes associations between logical pages and groups.

In still another aspect, an embodiment of the invention describes a decision making scheme that determines when to encode an allocated page based on the historical usage data.

BRIEF DESCRIPTION OF THE SEVERAL VIEWS OF THE DRAWINGS

FIG. 7 is a diagram illustrating a Write-Once-Memory (WOM) encoding scheme of an embodiment of the present invention.

DETAILED DESCRIPTION

Detailed embodiments of the methods and structures of the present invention are described herein; however, it is to be understood that the disclosed embodiments are merely illustrative of the described methods and structures that can be embodied in various forms. In addition, each of the examples given in connection with the various embodiments of the invention is intended to be illustrative, and not restrictive. Further, the Figures are not necessarily to scale, some features can be exaggerated to show details of particular components. Therefore, specific structural and functional details disclosed herein are not to be interpreted as limiting, but merely as a representative basis for teaching one skilled in the art to variously employ the methods and structures of the present invention.

Figure 1:
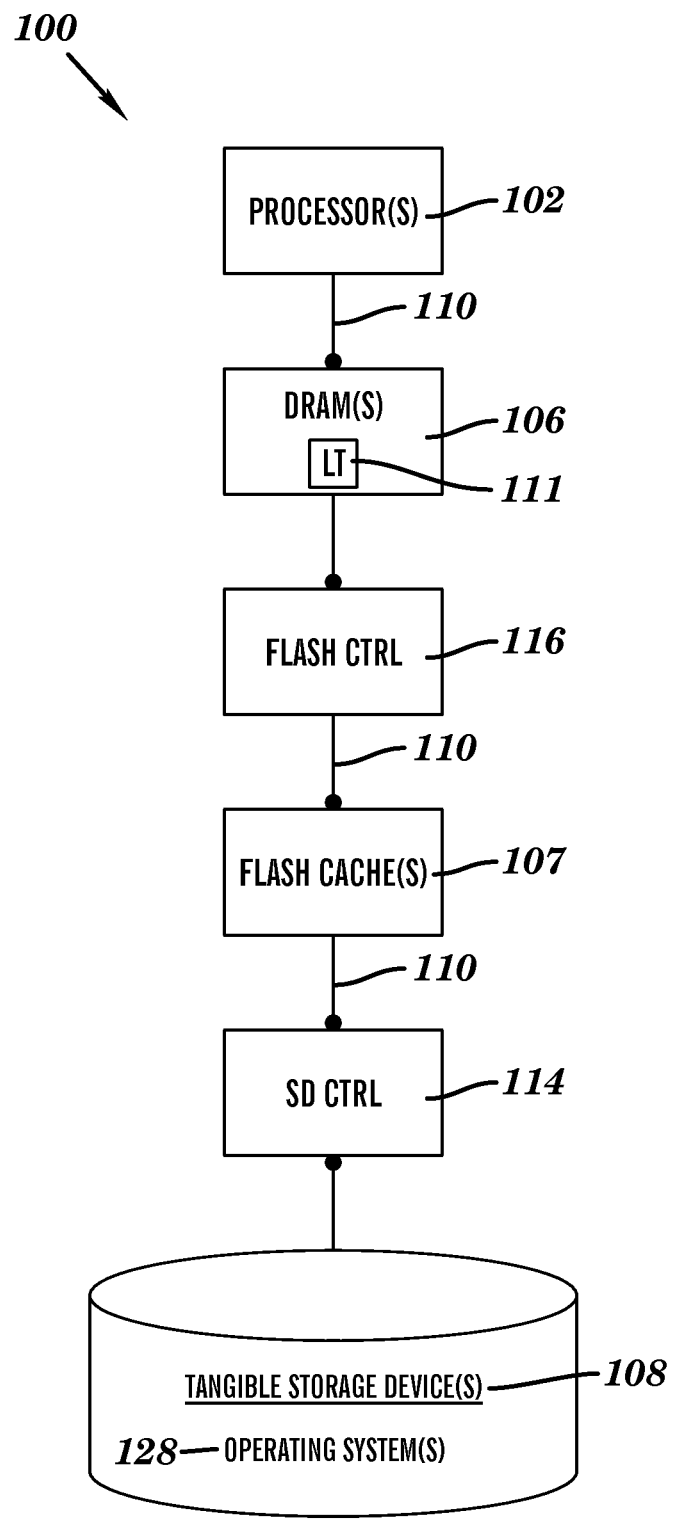
FIG. 1 is an illustration of internal components of a computer system using a flash-memory to cache a storage device in accordance with one embodiment of the present invention.

FIG. 1 is an illustration of internal components of a computer system using a flash-memory to cache a storage device in accordance with one embodiment of the present invention. FIG. 1 is intended as an exemplary embodiment, not as an architectural limitation for different embodiments of the present invention, and therefore, the particular elements shown in FIG. 1 should not be considered limiting with regard to the environments in which the illustrative embodiments of the present invention may be implemented. In FIG. 1 computer system 100 is shown in the form of internal components of a general-purpose computing device. The internal components of computer system 100 include one or more processors 102, a volatile system memory, such as one or more computer-readable dynamic random access memory (DRAM) 106, a non-volatile memory, such as one or more flash memory array 107 on one or more buses 110, one or more guest operating systems 128 and one or more computer-readable tangible storage devices 108. One or more processors 102 execute instructions from one or more of the DRAMs 106 and read and write data from\to one or more of the DRAMs 106. The one or more operating systems 128 are stored on one or more of the computer-readable tangible storage devices 108 for execution by one or more of the processors 820 via one or more of the DRAMs 106. One or more flash memory arrays 107 are located between one or more of the DRAMs 106 and one or more of the computer-readable tangible storage devices 108. In the embodiment illustrated in FIG. 1, each of the flash memory arrays 107 is a memory device, such as EEPROM (Electrically Erasable/Programmable Read Only Memory). Furthermore, one or more flash memory arrays 107 may utilize a NAND architecture to store and read the digital data stored within the memory cells of the device. A NAND architecture is one in which several flash memory cells are connected to one another in series.

Typically, the memory cells within a NAND flash memory array 107 are arranged into "pages" and "blocks" as discussed below in conjunction with FIG. 2. A page is a group of data bits that are accessed, internal to the memory, generally in a parallel manner at the same time. Most NAND flash memory devices perform read or write operations on a page-by-page basis. In a NAND flash memory, the pages of data within the memory may be arranged so that they are associated with one another in one or more "blocks" of data, typically as a result of the physical layout of the specific flash memory array at issue. While some embodiments of the present invention are described with reference to the NAND architecture, it should be appreciated that such embodiments are exemplary and are not intended to imply any limitation with regard to the architecture with which different embodiments may be implemented.

In this configuration, the size of one or more of the flash memory arrays 107 can be substantially greater than the size of one or more of the DRAMs 106. In one embodiment, the size of one or more of the DRAMs 106 may be 256 MB, while the size of one or more of the flash memory arrays 107 may be 1 GB. One or more flash memory arrays 107 may store both the data read by one or more of the DRAMs 106 and the data written out (evicted) by one or more of the DRAMs 106. In the embodiment illustrated in FIG. 1, each of the computer-readable tangible storage devices 108 is a magnetic disk storage device of an internal hard drive.

As shown in FIG. 1, the internal components of computer system 100 may also include storage device controller 114 and flash controller 116. Storage device controller 114 manages data transfer (block or sectors of data) between one or more of the computer-readable tangible storage devices 108 and one or more of the flash memory arrays 107 via bus 110. Flash controller 116 manages the data stored on one or more of the flash memory arrays 107 and communicates with one or more of the DRAMs 106. In various embodiments, flash controller 116 may include a programmed processor, a field programmable gate array (FPGA), and/or a dedicated controller chip. Flash controller 116 may be stored on one or more of the computer-readable tangible storage devices 108 for execution by one or more of the processors 102. Flash controller 116 may have an interface (not shown), for example, but not limited to, a Peripheral Component Interconnect Express (PCIE) interface to bus 110.

The illustrative embodiments used to describe the invention generally address data access operations in a flash-based disk memory. The data access operations may include reading operations and writing operations. Reading operations are associated with read requests and writing operations are associated with write requests. Read requests generally contain a request to read the data within a given logical page address. Write requests generally contain a request to write the data within a given logical page address. Each logical page address is associated with a specific physical page address within the flash memory array 107 through the use of a lookup table 111 maintained by flash controller 116. In an embodiment, lookup table 111 may be located in DRAM 106. In general, lookup table 111 maps each logical page address to a physical page address within flash memory array 107. The use of logical page addresses and a logical-to-physical page address conversion allows flash controller 116 to manage effectively the memory within flash memory array 107 and to implement the disclosed herein selective encoding mechanism for reducing invalidation rate.

Reading operations can be further classified as read-hit and read-miss operations. A read-hit operation occurs when the data to be read resides in the flash memory, such as flash memory array 107. A read-miss occurs when the data to be read is not available in the flash memory and typically should be transferred from a physical disk storage device, such as computer-readable tangible storage device 108. Writing operations can be further classified as write-hit and write-miss operations. A write-hit operation occurs when the data to be written resides in the flash memory. A write-miss occurs when the data to be written is not available in the flash memory and typically should be transferred to a physical disk storage device.

Figure 2:
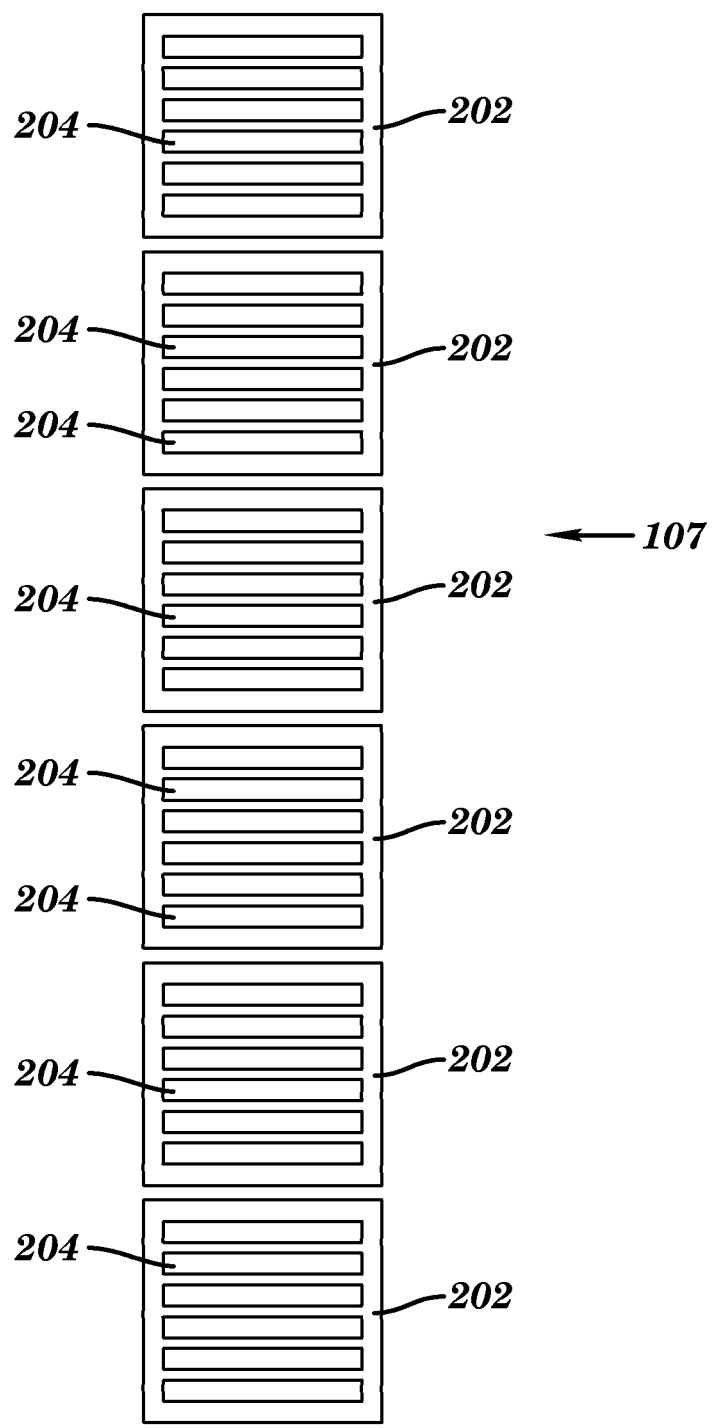
FIG. 2 illustrates a flash memory array, in accordance with an embodiment of the present invention.

FIG. 2 illustrates a flash memory array, in accordance with an embodiment of the present invention. Flash memory array 107, depicted in FIG. 2, is organized in units of pages 204 and blocks 202. In the addressing scheme of FIG. 2, a page is the smallest individually addressable data unit. In the exemplary embodiment of the present invention, each page of data has a specific length, which may range, for example, from 2 KB to 16 KB of data, plus additional bytes used as described in detail below. Flash controller 116 writes data into or reads data from the flash memory array 107 on a page-by-page basis. The various pages 204 of data are grouped together to form blocks 202. In general, as used herein, a block refers to a collection of physical pages that are associated with one another, typically in a physical manner. The physical association is such that block 202 is the smallest group of flash cache memory locations that can be erased at any given time. In an embodiment of the present invention, each block 202 includes, for example, 64 or 128 pages of data.

When dealing with flash memory array 107, the ERASE operation involves the placement of all of the physical pages that are subject to the erase operation in a particular logical state. The ERASE operation is performed on a block-by-block basis and the performance of an ERASE operation of a given block 202 places all of the physical pages 204 within the block 202 into a logical "1" state, corresponding to a state where there is no or relatively low charge stored within the storage devices associated with each physical page. Thus, while data may be written to the flash memory array 107 on a page-by-page basis, the memory locations can be erased only on a block-by-block basis in the embodiment shown herein.

As previously indicated, each block 202 in flash memory array 107 includes a plurality of pages. A page is a unit by which flash controller 116 reads and writes data, as described below in conjunction with FIGS. 3-6. Every page 204 may be categorized either as a valid page, an invalid page, an unused page, or a bad page. A valid page is a page storing valid data. An invalid page is a page storing invalid data. An unused page is a page storing no data. A bad page is a page physically unavailable, for example, because the page contains broken storage devices. Typically, only unused pages can be programmed (written to). Generally, to write to the same page twice, flash controller 116 erases the page (during ERASE block operation) after the first write and before the second write. An exception to this rule is that bits in a written page may be toggled from "1" to "0" without an intermediate erase. In various embodiments, flash controller 116 maintains information about the state of each page. It should be noted that pages 204 in FIG. 2 are physical pages. Flash controller 116 utilizes physical pages 204 to store data contained in a logical page. At least in some embodiments, each physical page may be associated with more than one logical page (not shown). For example, if a particular physical page has a memory capacity of 2,112 bytes, that physical page may include four logical pages each consisting of 512 bytes and a redundancy portion which may occupy the last 64 bytes of the physical page. For all valid physical pages 204 in flash memory array 107, flash controller 116 maintains information about one or more logical pages being held in that physical page in lookup table 111.

Figure 3:
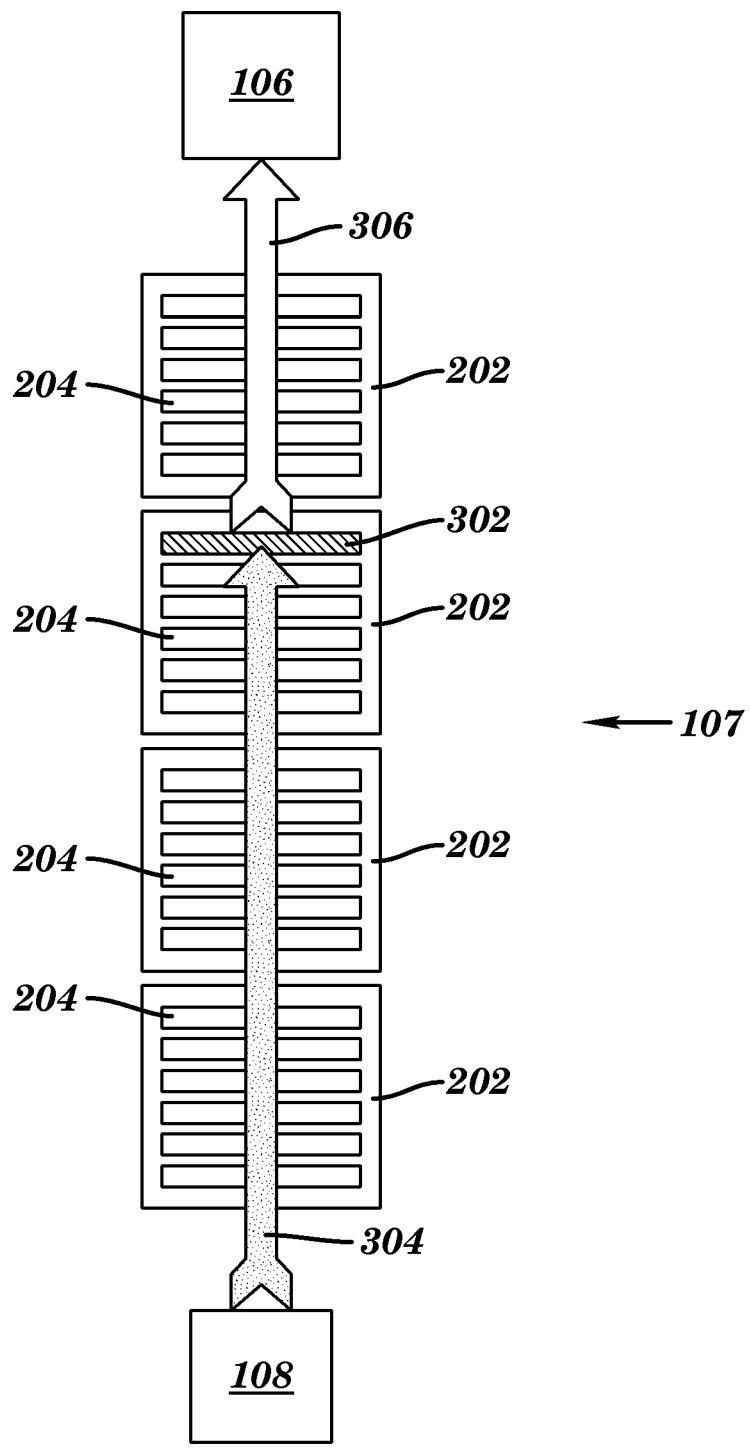
FIG. 3 illustrates operation of the flash memory array of FIG. 2 where the requested data is not in the array, in accordance with an embodiment of the present invention.

FIG. 3 illustrates operation of the flash memory array of FIG. 2 where the requested data is not in the array, in accordance with an embodiment of the present invention. In a read operation, if a corresponding data is not found in flash memory array 107 (cache read miss occurs) then flash controller 116 allocates one or more unused physical pages 302 and reads the missed data (arrow 304) from the main storage (storage devices 108) to the newly allocated page 302 (i.e. flash controller 116 programs page 302) of flash memory array 107. Flash controller 116 marks page 302 as valid and updates lookup table 111. This operation is known in the art as "read allocate". Then flash controller 116 sends the requested data to the requestor, for example, DRAM 106.

Figure 4:
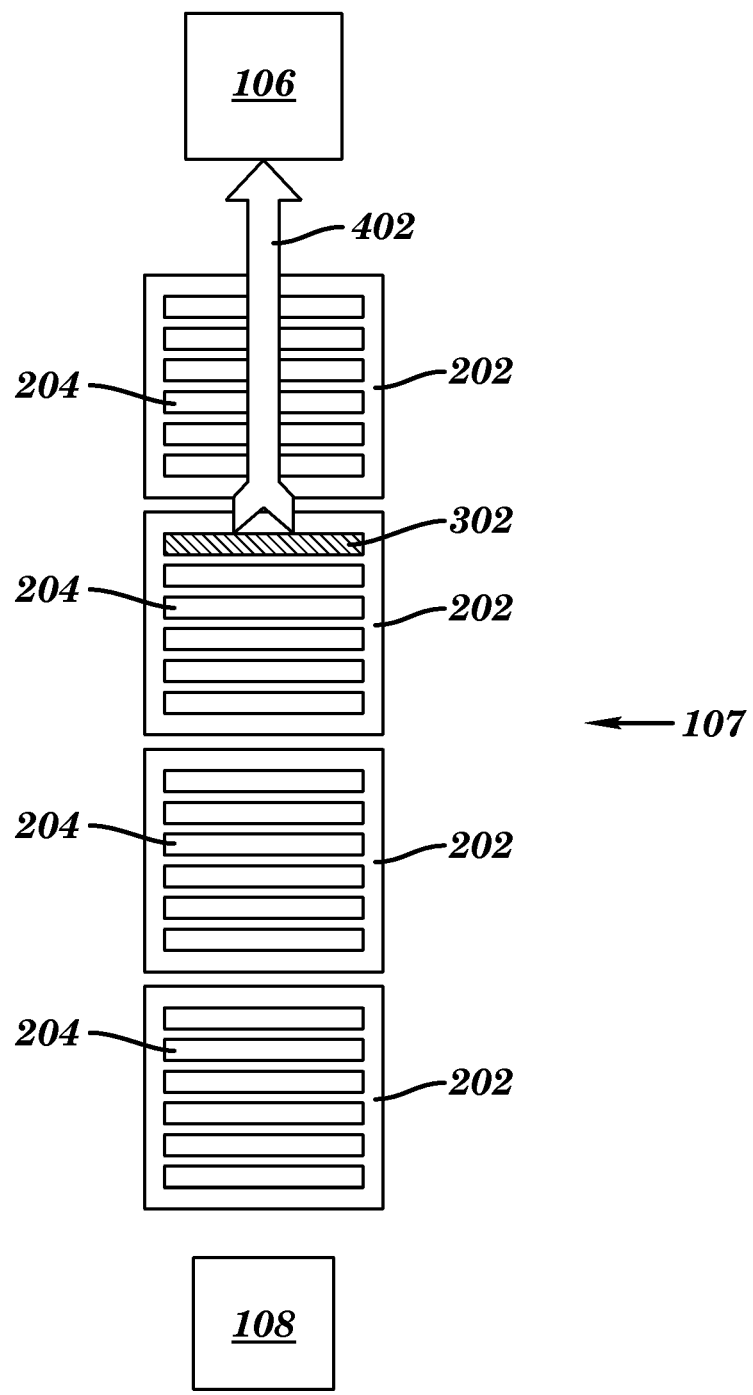
FIG. 4 illustrates operation of the flash memory array of FIG. 2 where the requested data is found in the array, in accordance with an embodiment of the present invention.

FIG. 4 illustrates operation of the flash memory array of FIG. 2 where the requested data is found in the array, in accordance with an embodiment of the present invention. In a read operation, if flash controller 116 finds a corresponding data in, for example, page 302 (cache read hit occurs) then flash controller 116 reads the contents of page 302 from flash memory array 107 and sends the read data to the requestor, for example, DRAM 106, as shown by arrow 402.

Figure 5:
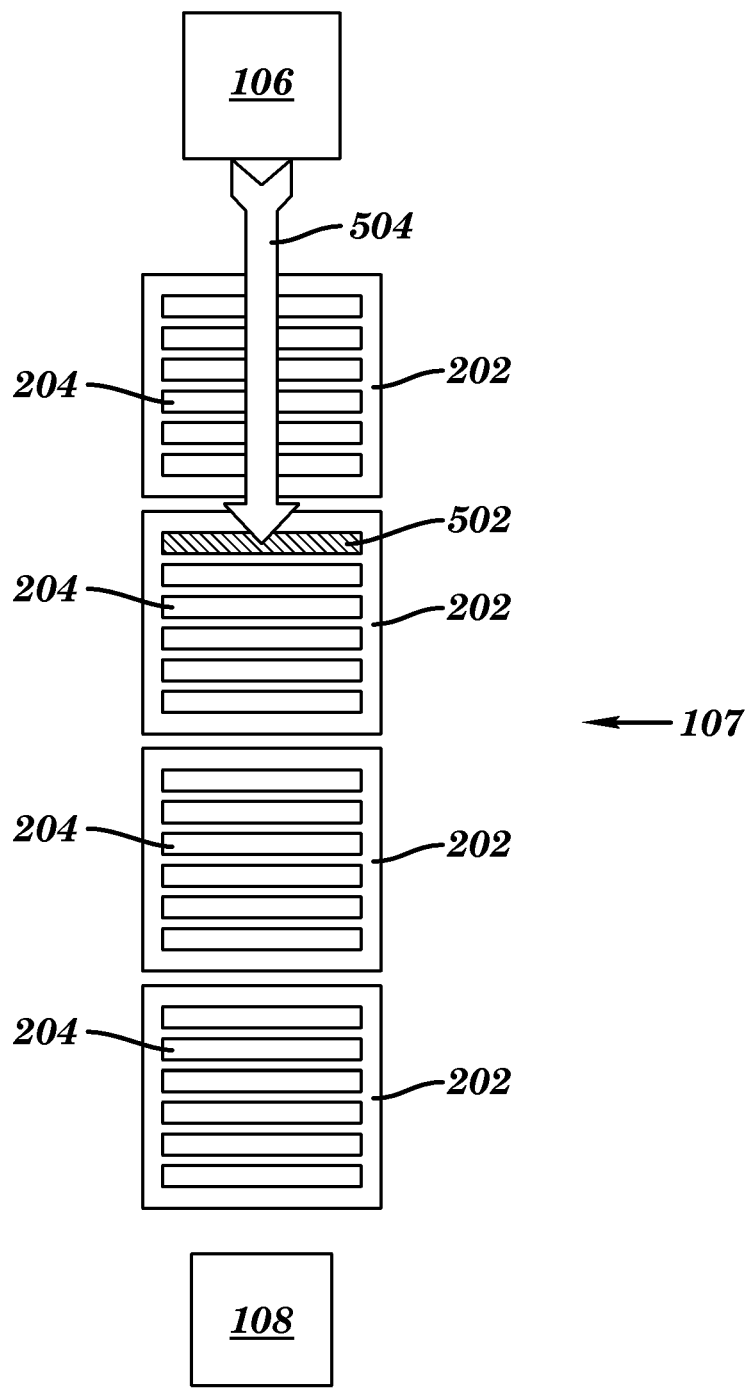
FIG. 5 illustrates operation of the flash memory array of FIG. 2 where the data to be written is not found in the array, in accordance with an embodiment of the present invention.

FIG. 5 illustrates operation of the flash memory array of FIG. 2 where the data to be written is not found in the array, in accordance with an embodiment of the present invention. In a write operation, if flash controller 116 does not find a corresponding data (in a write operation the corresponding data is a prior version of the present data to be written) in flash memory array 107 (cache write miss occurs) then flash controller 116 allocates one or more unused physical pages 502 and writes the missed data (arrow 504) to the newly allocated page 502 (i.e. flash controller 116 programs page 502) of flash memory array 107. Flash controller 116 marks page 502 as valid and updates lookup table 111. This operation is known in the art as "write allocate".

Figure 6:
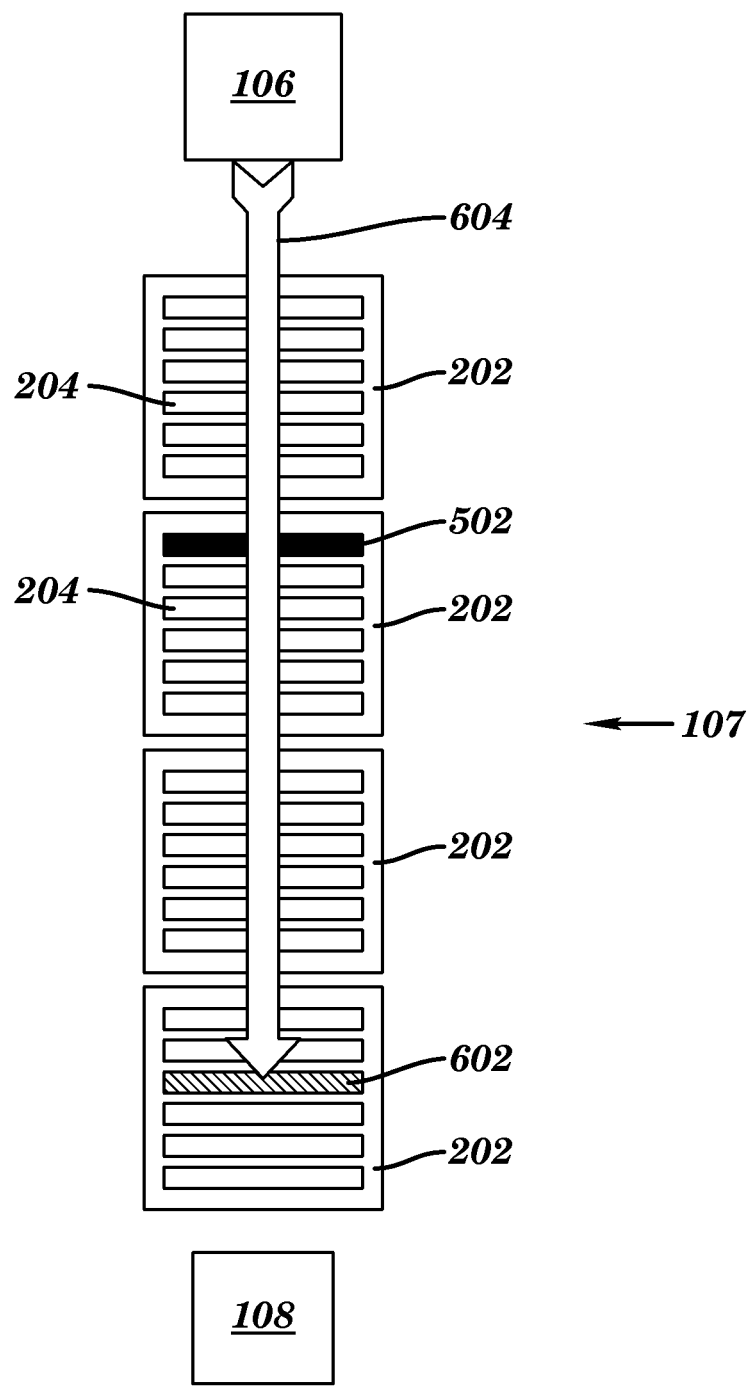
FIG. 6 illustrates operation of the flash memory array of FIG. 2 where the data to be written is found in the array, in accordance with an embodiment of the present invention.

FIG. 6 illustrates operation of the flash memory array of FIG. 2 where the data to be written is found in the array, in accordance with an embodiment of the present invention. In a write operation, if flash controller 116 finds a corresponding data in flash memory array 107, for example, page 502 (cache write hit occurs) then flash controller 116 allocates one or more unused physical pages 602 and programs the newly allocated page(s) 602 with the data to be written, as shown by arrow 604. Flash controller 116 marks the page holding a prior version of the corresponding data (page 502) as invalid and marks page 602 as valid in lookup table 111.

In an embodiment of the present invention, flash controller 116 stores data in flash memory array 107 by selectively utilizing a WOM (Write Once Memory) code known in the art. In a WOM code, a data is encoded in a number of so called "write-once bit positions" in a physical page. In an embodiment, the WOM code allows storing N−1 bits of the data in an N-bit codevalue. In a conventional 3-bit WOM code 3-bit values (WOM code values) are used to encode every 2 bits of the original data. The code is designed so that each time the data is changed, the new data can be written by only setting bits in the physical page, without resetting any bits. Usage of WOM encoding enables flash controller 116 to write to the same physical page a number of times, known in the art as "generations", without performing an expansive block erase operation.

FIG. 7 is a diagram illustrating the WOM encoding scheme of an embodiment of the present invention. The illustrated 3-bit WOM code, allows 2 generations (2 write operations per page). The first column of table 700 in FIG. 7 represents the initial logical value of data, the second column represents the first generation of writing (first WOM code value) and the third column represents the second generation of writing (rewriting) to the same page (second code value). Referring to table 700, assume that the data to be written to a physical page (for example, the first two bits in the logical page) has logical value "01" 702. According to the WOM encoding technique, the code value written to the page is "110" 704 in the first generation. Now assume that the second write operation to the same page tries to convert "01" to logical value "11" 706. In a flash memory array that does not implement the WOM encoding such write operation would lead to a page invalidation because to convert "01" to "11" requires resetting the first bit. As previously indicated, an invalid page can be reused only after an expansive block erase operation. However, the WOM encoding allows to convert "01" to "11" because the $2^{nd}$ generation WOM code value for "11" is "100" 708, which can be represented by setting the second bit of the code value ("110" 704) previously written to the same page.

By employing the WOM encoding technique known in the prior art, flash controller 116 can reduce the invalidation rate of a flash memory array by a factor of 2. However, it should be noted that the benefit of a second write operation to a physical page comes at the expense of using 50% more bits to represent a logical page of data. For example, if the logical page size is, for example, 2 KB, WOM encoding would require 3

KB of physical page space in flash memory array 107 to represent such logical page. To implement the WOM encoding technique flash controller 116 may use, for example, logic gates. While some embodiments of the present invention are described with reference to the 3-bit WOM code, it should be appreciated that such embodiments are exemplary and are not intended to imply any limitation with regard to the WOM code with which different embodiments may be implemented.

Figure 8:
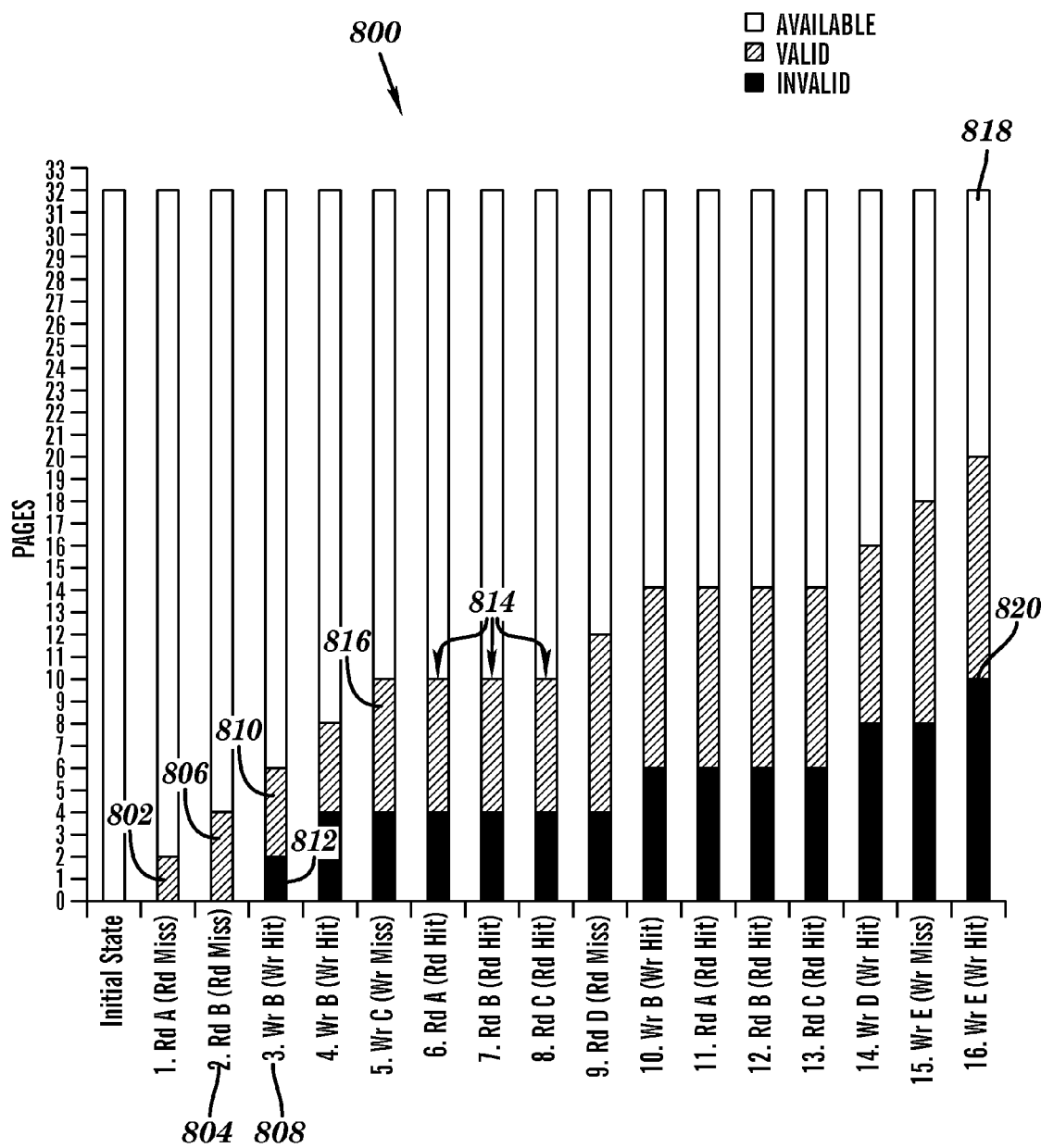
FIGS. 8 and 9 illustrate physical page usage in the flash memory array of FIG. 2 without the WOM encoding scheme and with a static WOM encoding scheme, respectively, in accordance with the prior art.
Figure 9:
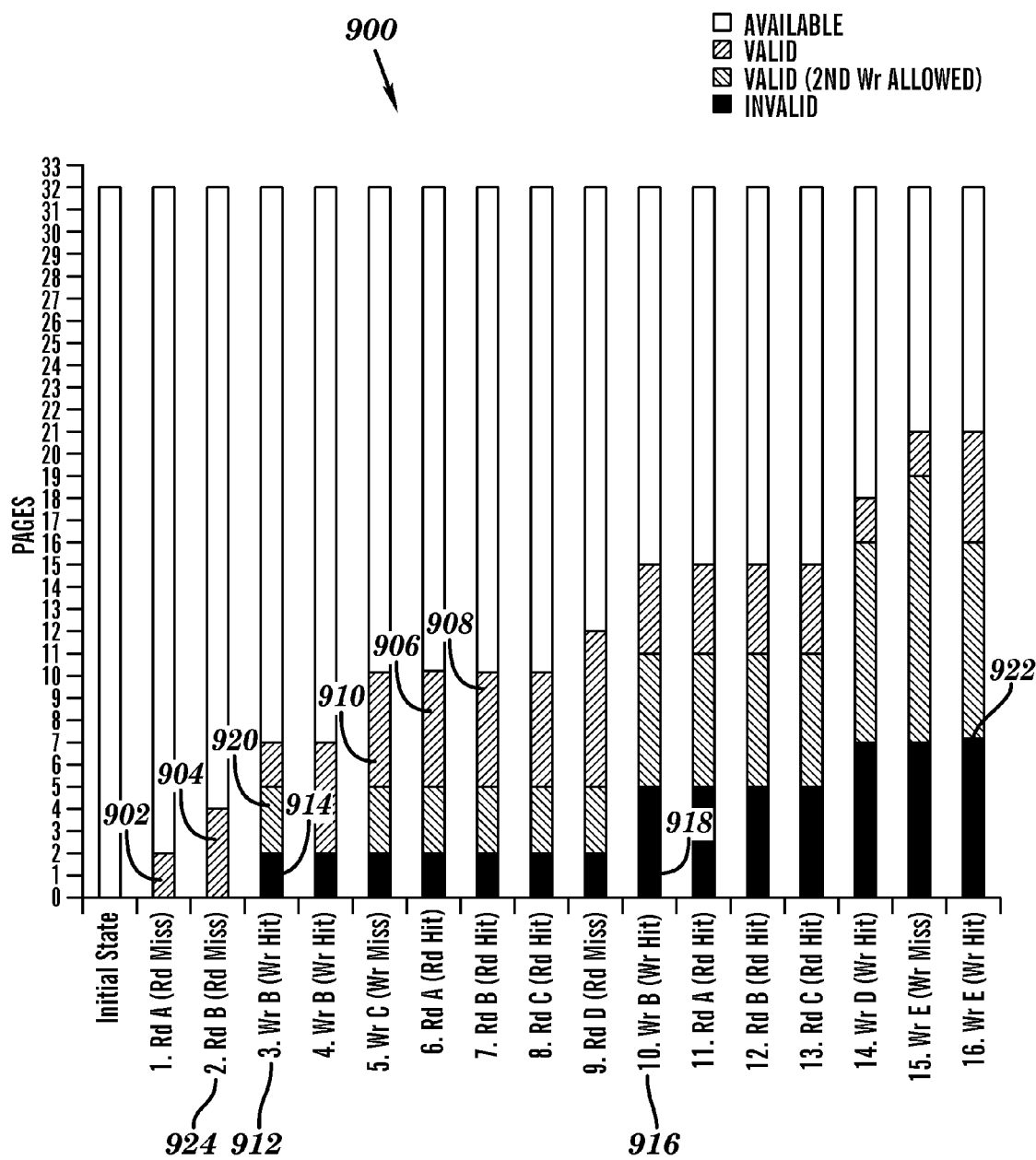

FIGS. 8 and 9 illustrate physical page usage in the flash memory array of FIG. 2 without the WOM encoding scheme and with a static WOM encoding scheme, respectively, in accordance with the prior art. As depicted in FIG. 8, an exemplary flash memory array may be partitioned into 32 physical pages, represented by the Y axis of page usage graph 800. The X axis of page usage graph 800 lists an exemplary sequence of data access requests corresponding to logical pages A, B, C, D and E. Page usage graph 800 illustrates how a number of pages having a particular processing status (i.e. available, valid, invalid) changes as flash controller 116 processes each request in the exemplary sequence of data access requests shown in FIG. 8. The first two physical pages allocated are used to store data in response to a first write request for a particular logical address. For example, in FIG. 8, two physical pages 802 are programmed to store data in response to a first read request associated with logical address A (page A). The exemplary allocation scheme shown in FIG. 8 allocates two physical pages for each logical page. Subsequent read request for logical address B 804 results in a read miss (since logical page B is not in the flash memory array at the time flash controller 116 processes request 804). Therefore, in response to a read request for logical page B 804 two more physical pages 806 are allocated and programmed. For subsequent data updates (e.g. subsequent write requests that result in write hits) to the same logical address, two more available for use physical pages are allocated to store the updated data, and the previous physical pages with the old data are invalidated. For example, in response to a write request associated with the logical address B 808 two physical pages 810 are programmed to store the updated data and two physical pages 812 are invalidated. It should be noted that read hits make no difference to the page states, as shown by 814. In response to a write request that results in a read miss, two new pages 816 are allocated. As can be seen in FIG. 8, in a system without a WOM encoding, the number of available pages 818 is reduced to 12 by the 16$^{th}$ request. In addition, at the end of processing of the exemplary sequence of data requests shown in FIG. 8, there are 10 invalid physical pages 820.

FIG. 9 illustrates physical page usage in a conventional flash memory array 107 when a static WOM encoding scheme is used. In this illustrated system, a WOM encoding is used for all write operations. Assuming that system depicted in FIG. 9 uses a 3-bit WOM code it should be noted that two unused physical pages are allocated for each not encoded logical page and three unused physical pages are allocated for each WOM encoded logical page. The X axis of the page usage graph 900 lists the same exemplary sequence of data access requests as in FIG. 8. As shown in FIG. 9, in response to a read operation that result in a read miss, two unused physical pages are allocated and programmed for data read request, depicted by 902 and 904. In the system illustrated in FIG. 9, similarly to the system illustrated in FIG. 8, read operations that result in read hits have no effect on page states within the flash memory array, as shown by 906 and 908. However, in this scheme, in response to a write operation that results in a write miss, three unused physical pages 910 are allocated and programmed every time. For subsequent data updates (e.g. subsequent write requests that result in write hits) to the same logical address, three more available for use physical pages are programmed to store the updated data, and the previous physical pages with the old data are invalidated. However, in some cases two pages are invalidated while in other cases three pages become invalid depending on whether those pages were allocated in response to a read operation or in response to a write operation. For example, in response to third data access request 912 (a write request associated with logical address B which results in a write hit) only two pages 914 are invalidated that were programmed in response to second data access request 924 (a read request that resulted in a read miss). As previously indicated, according to the presently described scheme, all read requests that result in read misses lead to programming of two not encoded physical pages. On the other hand, in response to tenth data request 916, three pages 918 become invalid, because the newly invalidated pages had been allocated and WOM encoded in response to a write request that resulted in a write hit, as shown by 920.

As can be seen in a system implemented with a conventional WOM encoding scheme, at the end of processing of the exemplary sequence of data requests shown in FIG. 9, there are seven invalid physical pages 922, as opposed to ten invalid physical pages 820 in FIG. 8. It should be noted that the WOM encoding scheme illustrated in FIG. 9 may have some deficiencies. Firstly, the conventional WOM-encoding scheme recommends WOM encoding of all physical pages allocated in response to a write request. Secondly, the conventional WOM-encoding scheme recommends not to encode any physical pages allocated in response to a read request that results in a read miss. Thirdly, the conventional WOM-encoding scheme recommends that once a logical page is WOM encoded all subsequent data update operations to that logical page should use the WOM-encoding.

Figure 10:
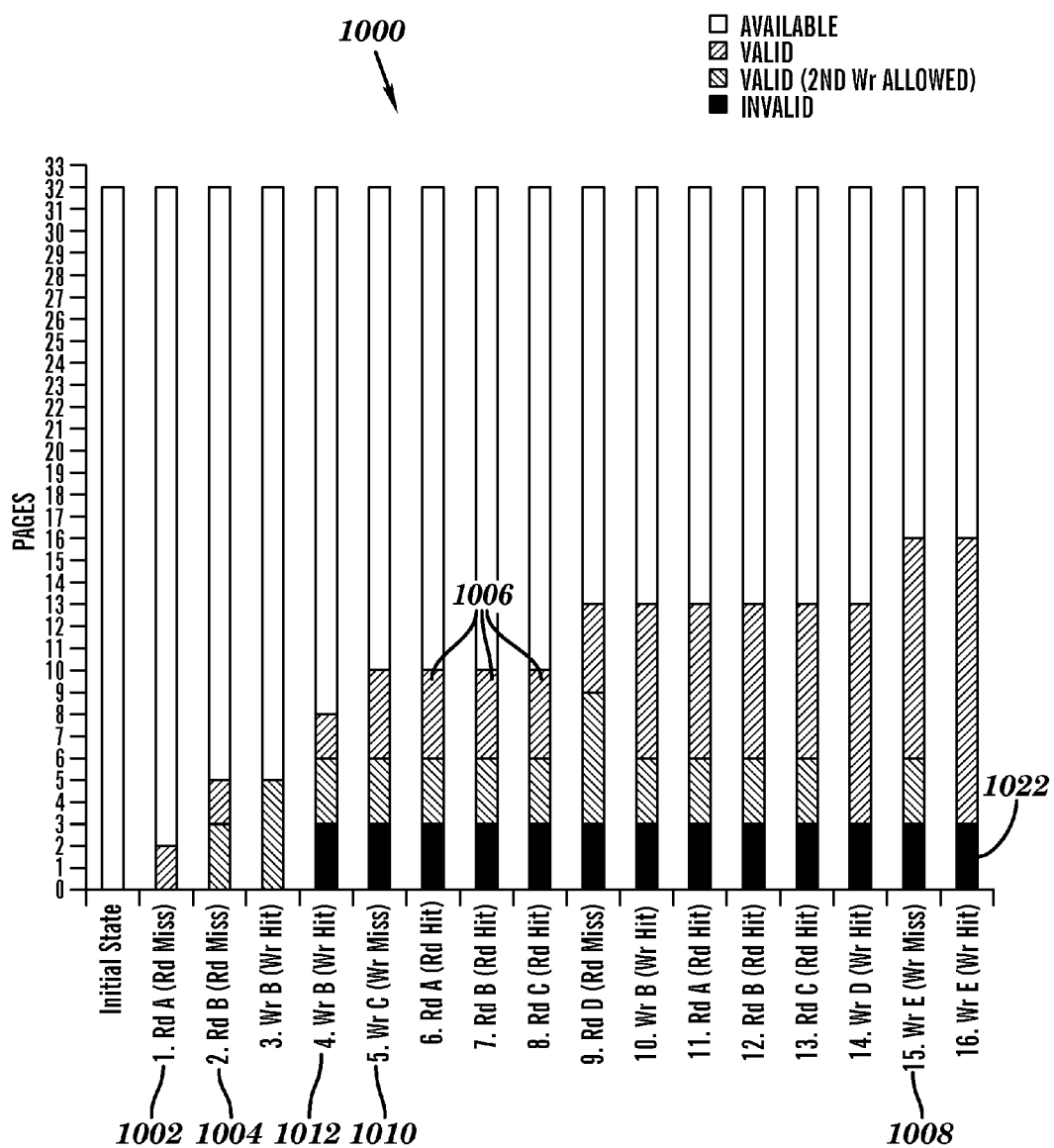
FIG. 10 illustrates physical page usage in the flash memory array of FIG. 2 when a selective WOM encoding scheme is used, in accordance with an embodiment of the present invention.

FIG. 10 illustrates physical page usage in a flash memory array when a selective WOM encoding scheme is used, in accordance with an embodiment of the present invention. The selective WOM encoding scheme illustrated in FIG. 10 addresses the above-identified deficiencies of a conventional WOM-encoding scheme. In an embodiment, flash controller 116 utilizes WOM encoding scheme selectively based on a maintained historical data described below in conjunction with FIG. 11. The X axis of the page usage graph 1000 lists the same exemplary sequence of data access requests as shown in FIGS. 8 and 9. As shown in FIG. 10, in response to a read operation that results in a read miss, advantageously, either two or three unused physical pages are allocated, depending on whether or not there is an expected future write operation to the same logical page. For example, in response to first data access request 1002 (read request corresponding to logical address A, which results in a read miss) only two not encoded pages are allocated by flash controller 116 if flash controller 116 determines that a probability of a future write operation associated with the logical page A is substantially low. On the other hand, if in response to second data access request 1004 (a read request associated with logical address B which results in a read miss) flash controller 116 determines that there is likely to be another write to logical page B then flash controller 116 allocates (and encodes) three physical pages. The decision making logic used by flash controller 116 is described below in conjunction with FIGS. 11 and 12. In the system illustrated in FIG. 10 read operations that result in read hits have no effect on page states within the flash memory array, as shown by arrows 1006. As shown in FIG. 10, in response to a write request, advantageously, flash controller 116 selectively encodes allocated pages. As shown in FIG. 10, a system implemented with a selective WOM encoding, in accordance with an embodiment of the present invention, at the end of processing of the exemplary sequence of data requests, there are 3 invalid physical pages 1022, as opposed to 10 invalid physical pages 820 in FIGS. 8 and 7 invalid physical pages 922 in FIG. 9. Thus, FIG. 10 illustrates that selective usage of WOM encoding scheme in flash memory array 107 by flash controller 116 may substantially reduce the invalidation rate.

Figure 11:
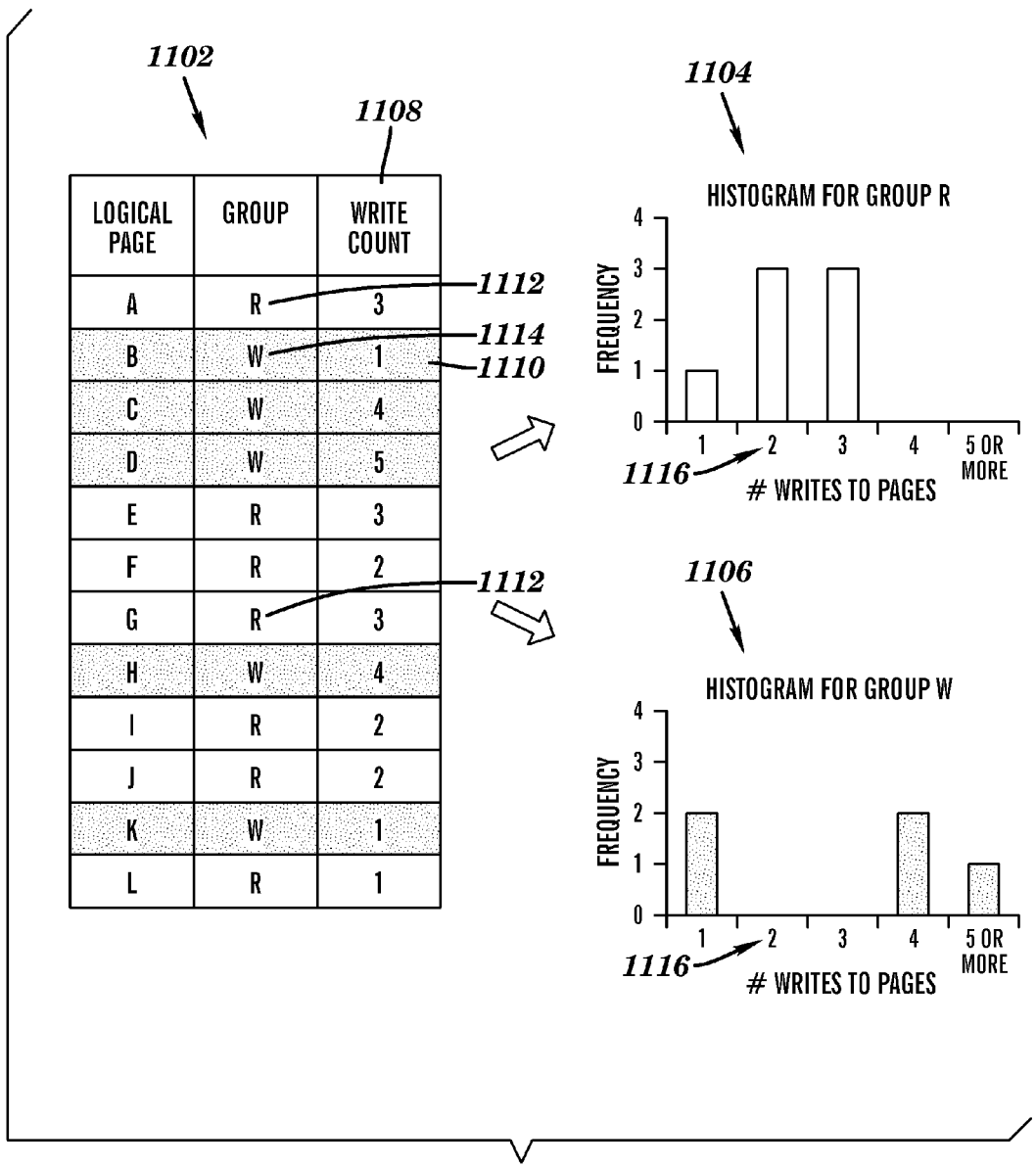
FIG. 11 illustrates an exemplary historical usage data maintained by the flash controller of FIG. 1, in accordance with an embodiment of the present invention.

FIG. 11 illustrates an exemplary historical usage data maintained by the flash controller of FIG. 1, in accordance with an embodiment of the present invention. In an embodiment, flash controller 116 may use a table 1102 to maintain at least some of the historical usage data. In an embodiment, flash controller 116 maintains, for each logical page stored in flash memory array 107, a counter, shown in column 1108, that is used to maintain a count of the number of times the one or more physical pages associated with the logical page have been accessed through a data write operation. Counters depicted in column 1108 start the count at 1. For example, in FIG. 11, counter 1110 associated with the logical page B is set to 1 indicating that data contained in the logical page B was stored in the flash memory array in response to either a read miss operation or a write miss operation. Furthermore, counter 1110 indicates that there have been no further data write operations that have accessed the one or more physical pages associated with the logical page B. During each write operation associated with a specific logical page, flash controller 116 increments the counter corresponding to the specific logical page in table 1102.

Counters shown in column 1108 may take many forms. In an embodiment, the plurality of counters may be physically located within the same package as flash controller 116 or, in alternate embodiment, in flash memory array 107. Each of the counters shown in column 1108 may be implemented directly through a hardware counter that is set to be reset each time a corresponding write operation is performed, or it can be implemented in software or firmware through an appropriately programmed flash controller 116. In the example of FIG. 11, table 1102 is illustrated as being included in the lookup table 111.

As illustrated in FIG. 11, historical usage data table 1102 may also include a unique group identifier associated with a group of logical pages which are expected to have similar characteristics, such as, for example, similar data access patterns. In another embodiment, the group identifier may include a unique operating system process ID. In general, the number of groups may be selected based on a wide variety of workload characteristics. The number of pages within a group may vary widely. For example, typically, logical pages that are stored in a flash memory array in response to a read miss operation may have a different data access pattern behavior as compared to logical pages that are stored in the flash memory array in response to a write miss operation. In an embodiment, flash controller 116 may maintain two groups, for example, first group "R" 1112 and second group "W" 1114. Flash controller 116 may group all logical pages which have been stored in flash memory array 107 in response to a read miss operation in the first group (group "R" 1112). Similarly, flash controller 116 may group all logical pages which have been stored in flash memory array 107 in response to a write miss operation in the second group (group "W" 1114). In alternative embodiment, all logical pages that are stored in flash memory array 107 may be divided into groups based on a computer process identifier associated with each logical page. Such grouping of logical pages may enable flash controller 116 to separately track historical data access behavior for separate software applications running on processor 102. Flash controller 116 may assign a page group to a logical page in response to first write operation associated with the logical page. In various embodiments, the grouping criteria may change over time in any manner suitable for the specific implementation.

In the embodiment illustrated in FIG. 11 flash controller 116 may also maintain one or more histograms associated with each group identifier. For example, flash controller 116 may maintain first histogram 1104 associated with first group 1112 and second histogram 1106 associated with second group 1114. Each histogram may contain a plurality of bins 1116. The plurality of bins 1116 may be less than or equal to a predetermined maximum number of bins. In an embodiment, the maximum number of bins may be set to 5. Each of the bins 1116 stores a frequency indicator indicating an occurrence frequency of a specific number of write operations accessing a logical page within the group. For example, first histogram 1104 indicates that first group 1112 contains one logical page (shown as page L in 1102) that has been written to only once, three logical pages that have been written to two times (shown as pages F, I and J in 1102) and three logical pages that have been written to three times (shown as pages A, E and G in 1102). Second histogram 1106 indicates frequency information associated with second group 1114. In an embodiment, each histogram may be implemented as a predetermined set of counters, one counter per histogram bin 1116. In this embodiment, flash controller 116 continually updates data contained in table 1102 and histograms 1104 and 1106.

Figure 12:
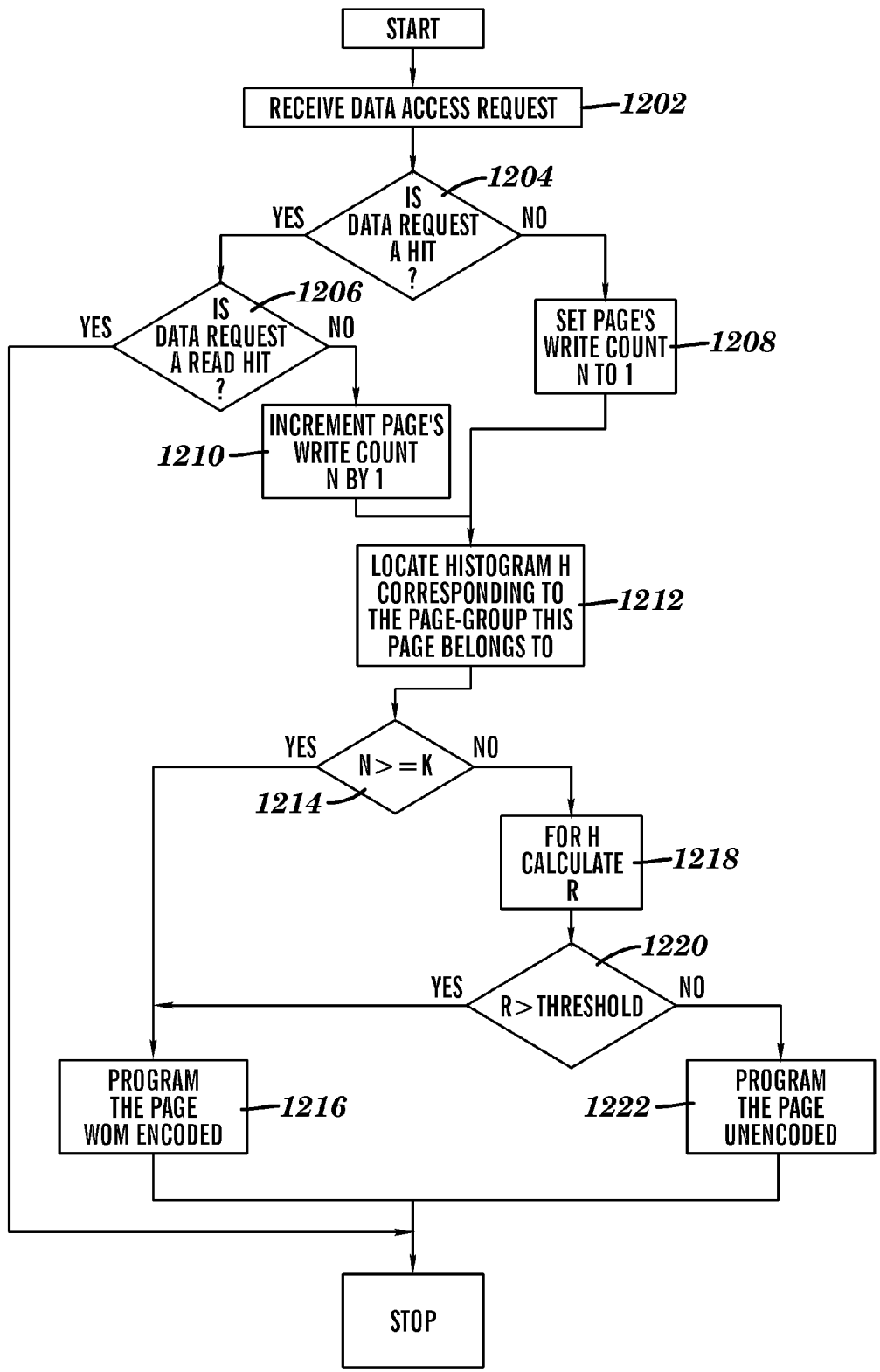
FIG. 12 illustrates in more detail the steps performed by the flash controller of FIG. 1 for storing data in flash memory array, according to one embodiment of the present invention.

FIG. 12 illustrates in more detail the steps performed by the flash controller of FIG. 1 for storing data in flash memory array, according to one embodiment of the present invention. At step 1202, flash controller 116 receives a data access request (for example, a read request or a write request) via bus 110. The data access request includes a logical page address. At step 1204, flash controller 116 determines whether the requested data is present in flash memory array 107 (whether a cache hit occurred in response to the data access request). In response to determining that a cache hit occurred (yes branch of decision block 1204), flash controller 116 determines whether the cache hit occurred in response to a read request (at decision block 1206). If the cache hit occurred in response to a read request (yes branch of decision block 1206), flash controller 116 does not need to program physical pages in order to write data to flash memory array 107 because the data requested by the read request is already present in flash memory array 107. Flash controller 116 may retrieve such data and send it to the requesting component, for example, DRAM 106 via bus 110.

In response to determining that the requested data is not present in flash memory array 107 (no branch of decision block 1204), flash controller 116 sets a value of a counter (associated with the logical page included in the data access request) to 1 at step 1208, because the data written in response to the cache miss will be the first write of the corresponding logical page. For illustrative purposes only this counter will be referred to as N. If the cache hit occurred in response to a write request (no branch of decision block 1206), flash controller 116 increments the value of the counter (for example, N) associated with the logical page by 1 at step 1210.

At step 1212, flash controller 116 identifies a histogram corresponding to a group the logical page belongs to. For example, referring back to FIG. 11, if flash controller 116 received a data access request requesting to access logical page G, flash controller 116 determines that the logical page G belongs to first group 1112. At step 1212, flash controller 116 identifies first histogram 1104 associated with first group 1112. As previously indicated each histogram has a predetermined number of bins. For illustrative purposes only this number of bins will be referred to as K.

At step 1214, flash controller 1116 compares the counter N with the predetermined number of bins (K) in the identified histogram (for example, first histogram 1104). As described above, in order to accommodate the received data access request (unless a read hit occurs) flash controller 116 allocates one or more unused physical pages in flash memory array 107 that will be used to store the contents of the logical page included in the data access request. Flash controller 116 links the allocated pages to the logical page via lookup table 111. In an embodiment of the present invention, in response to determining that N is greater than or equal to K (yes branch of decision block 1214) flash controller 116 uses WOM encoding in step 1216 to store the data in the allocated physical pages based on the reasoning that if there are more updates to a logical page than the predetermined expected number (K) in a corresponding histogram then there is a substantial possibility that flash controller 116 may receive future write requests associated with the logical page. Therefore, flash controller 116 uses WOM encoding at step 1216. In response to a determination that N is less than K (no branch of decision block 1214) flash controller 116 calculates a likelihood ratio (R) for the identified histogram (histogram 1104) at step 1218. In an embodiment, flash controller 116 may calculate the likelihood ratio R with the formula:

$$R = [\text{frequency}(N+1) + \text{frequency}(N+2) + \ldots + \text{frequency}(K)] / [\text{frequency}(N) + \text{frequency}(N+1) + \text{frequency}(N+2) + \ldots + \text{frequency}(K)]$$

In the formula above N is the counter associated with the logical page, K is the predetermined number of bins in the histogram associated with the logical page. Frequencies in the formula above represent individual counters in the histogram that keep track of how many pages within the group had a specific number of write requests (i.e. first counter within a histogram counts the number of pages that have been written to the flash memory array one time, second counter counts the number of logical pages that have been written two times, and so on). For example, if a data access request having a logical page L address is received by flash controller 116 results in a read miss, the counter N is equal to 1. Thus, using historical data illustrated in FIG. 11, the likelihood ratio calculated by flash controller 116 for the illustrated example is:

$$R = [\text{frequency}(2 \text{ writes}) + \text{frequency}(3 \text{ writes}) + \ldots + \text{frequency}(5 \text{ writes})] / [\text{frequency}(1 \text{ write}) + \text{frequency}(2 \text{ writes}) + \text{frequency}(3 \text{ writes}) + \ldots + \text{frequency}(5 \text{ writes})] = 6/7$$

At step 1220, flash controller 116 compares the ratio R calculated in step 1218 with a predetermined threshold value to determine whether to use WOM encoding when programming logical page data in the flash memory array (i.e. allocated physical pages). The predetermined threshold may be selected or derived in any suitable manner within the scope of various embodiments of the present invention. In one embodiment, the predetermined threshold may be set to about 0.5. In response to determining that R is greater than the predetermined threshold value calculated in step 1218(yes branch of decision block 1220), flash controller 116 uses WOM encoding to program the logical page data in the allocated physical pages at step 1216. On the other hand, in response to determining that R is less than or equal to the predetermined threshold value calculated in step 1218 (no branch of decision block 1220), flash controller 116 stores the logical page data not encoded in the allocated physical pages at step 1222, even if the data access request is a write request. Continuing with the example above, at step 1220, flash controller compares that ratio R (6/7 or 0.86) with the predetermined threshold (i.e. 0.5). In this case the likelihood ratio R indicates that the probability of a future write request to this logical page is approximately 0.86 and this probability is greater than the predetermined threshold. Thus, at step 1220, flash controller 116 decides to store the logical page using WOM encoding.

Flash controller 116 can be written in various programming languages including low-level, high-level, object-oriented or non object-oriented languages. Alternatively, the functions of flash controller 116 can be implemented in whole or in part by computer circuits and other hardware (not shown).

While the present invention has been particularly shown and described with respect to preferred embodiments thereof, it will be understood by those skilled in the art that the foregoing and other changes in forms and details can be made without departing from the spirit and scope of the present invention. It is therefore intended that the present invention not be limited to the exact forms and details described and illustrated, but fall within the scope of the appended claims.

What is claimed is:

1. A method for storing data in a flash memory array having a plurality of physical pages, the method comprising:
   using a computer, receiving a request to perform a data access operation through a communication bus, the request comprising data and a logical page address;
   allocating one or more physical pages of the flash memory array to perform the data access operation; and
   based on a historical usage data of the flash memory array, selectively encoding the data contained in the logical page into the one or more physical pages, wherein selectively encoding the data contained in the logical page into the one or more physical pages comprises:
      determining a probability of a subsequent data access request updating the data contained in the logical page;
      determining whether the probability exceeds a predetermined threshold and;
      in response to determining that the probability exceeds the predetermined threshold, encoding the data contained in the logical page into the one or more physical pages.

2. The method of claim 1, wherein the selectively encoding the data comprises selectively encoding the data according to a Write Once Memory (WOM) code.

3. The method of claim 2, wherein the WOM code enables storing N-1 bits of the data in an N-bit code value.

4. The method of claim 1, wherein the historical usage data of the flash memory array comprises a plurality of counters, wherein each counter of the plurality of counters corresponds to a logical page stored in the flash memory array.

5. The method of claim 4, wherein each counter of the plurality of counters comprises a hardware counter configured to count a number of write operations associated with the corresponding logical page.

6. The method of claim 4, wherein each counter of the plurality of counters comprises a software counter configured to count a number of write operations associated with the corresponding logical page.

7. The method of claim 1, further comprising:
   dividing a plurality of logical pages stored within the flash memory array into two or more groups based on a predetermined criteria;

in response to the request, assigning the logical page into a group of the two or more groups based on the predetermined criteria; and updating the historical usage data corresponding to the assigned group.

8. The method of claim 7, wherein dividing the plurality of the logical pages further comprises generating a group identifier for each of the two or more groups.

9. The method of claim 7, wherein the predetermined criteria includes data access pattern shared by all logical pages in a corresponding group.

10. The method of claim 7, wherein the predetermined criteria comprises a process identification (ID) value.

11. The method of claim 1, wherein the historical usage data is stored in a lookup table and wherein the lookup table contains one or more entries associating the logical page with the one or more physical pages.

12. The method of claim 7, wherein the historical usage data comprises a histogram data structure having a plurality of bins and wherein the histogram data structure corresponds to a group of the two or more groups.

13. The method of claim 12, wherein the histogram data structure comprises a plurality of frequency indicators, each of the plurality of frequency indicators indicating an occurrence frequency of a specific number of write operations accessing a logical page within the corresponding group.

14. The method of claim 12, wherein the plurality of bins is less than or equal to a predetermined maximum number of bins.

15. The method of claim 1, wherein the selectively encoding the data includes encoding the data in response to a read request.

16. A computer program product for storing data in a flash memory array having a plurality of physical pages, the computer program product comprising one or more non-transitory computer-readable tangible storage devices and program instructions stored on at least one of the one or more non-transitory computer-readable tangible storage devices, the program instructions comprising:

program instructions executable by a computer to receive a request to perform a data access operation through a communication bus, the request comprising data and a logical page address;

program instructions to allocate one or more physical pages of the flash memory array to perform the data access operation; and program instructions to, based on a historical usage data of the flash memory array, selectively encode the data contained in the logical page into the one or more physical pages, wherein selectively encoding the data contained in the logical page into the one or more physical pages comprises:

program instructions to determine corresponding to a probability of a subsequent data access request updating the data contained in the logical page;

program instructions to determine whether the probability exceeds a predetermined threshold; and in response to determining that the probability exceeds the predetermined threshold program instructions to encode, the data contained in the logical page into the one or more physical pages.

* * * * *